Feb. 5, 1952 L. A. HAYOT 2,584,447
VARIABLE-SPEED CHAIN DRIVING DEVICE
Filed Sept. 3, 1947 5 Sheets-Sheet 1
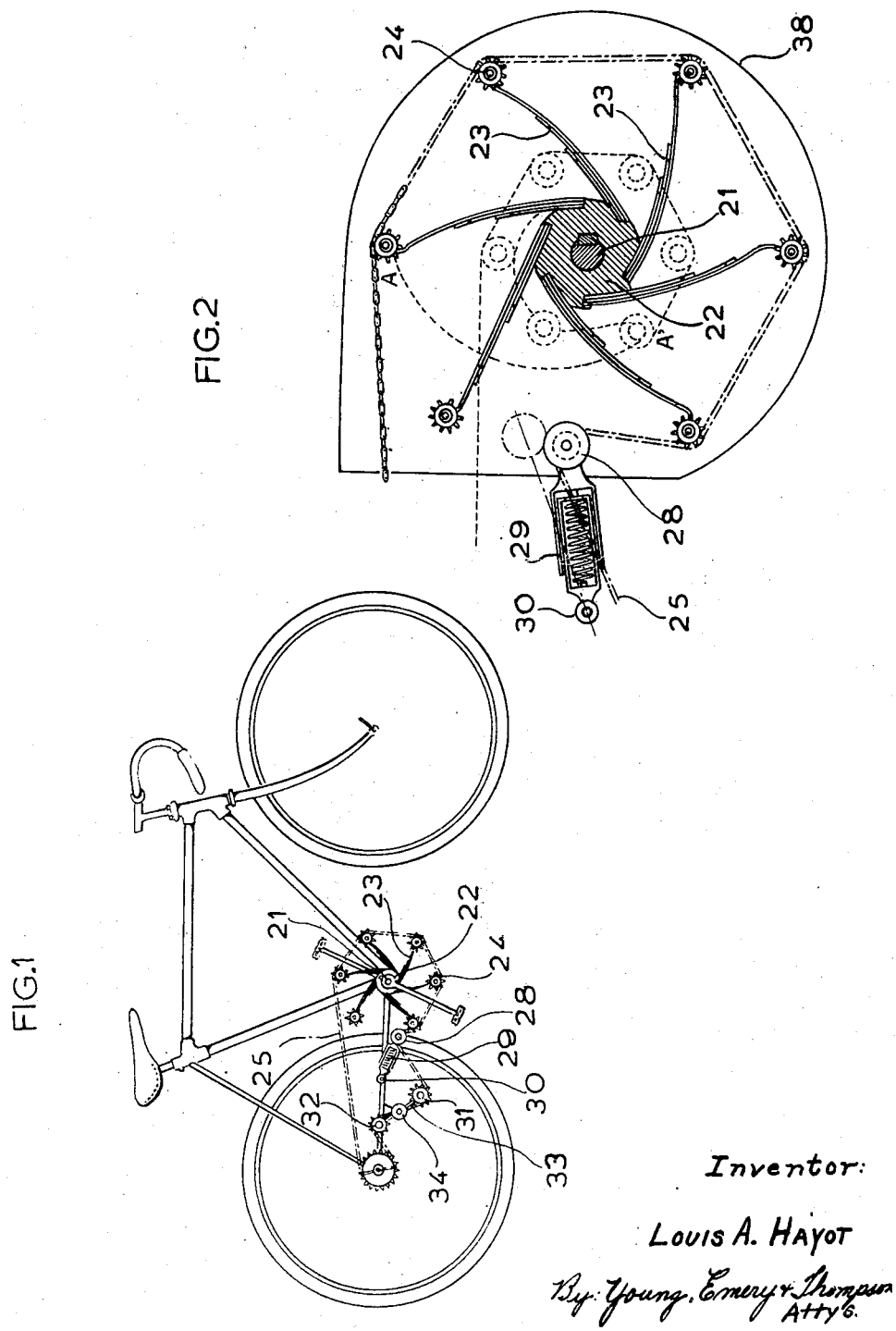
Inventor:
Louis A. Hayot
By Young, Emery & Thompson
Attys.

Feb. 5, 1952 L. A. HAYOT 2,584,447
VARIABLE-SPEED CHAIN DRIVING DEVICE
Filed Sept. 3, 1947 5 Sheets-Sheet 2
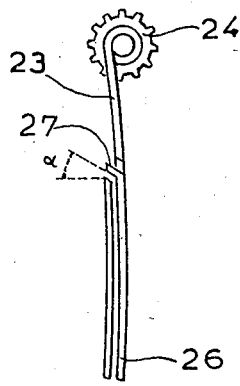
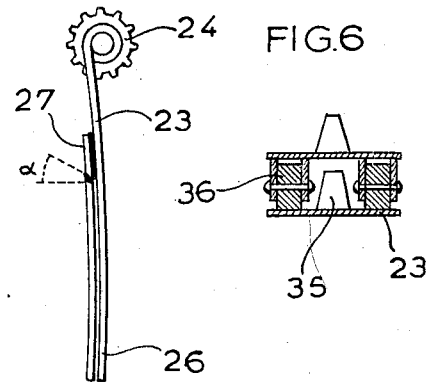
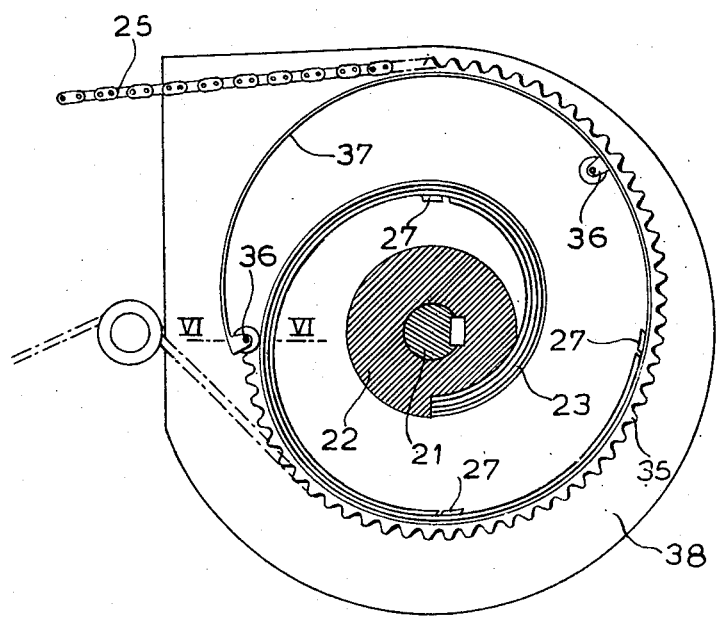
Inventor:
Louis A. Hayot
By: Young, Emery + Thompson
Attys.

Feb. 5, 1952 L. A. HAYOT 2,584,447
VARIABLE-SPEED CHAIN DRIVING DEVICE
Filed Sept. 3, 1947 5 Sheets-Sheet 3
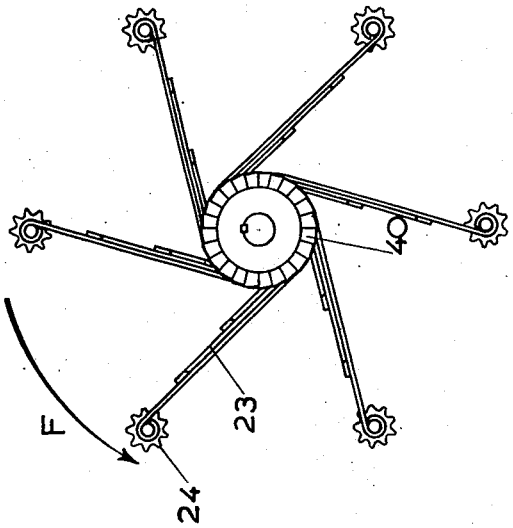
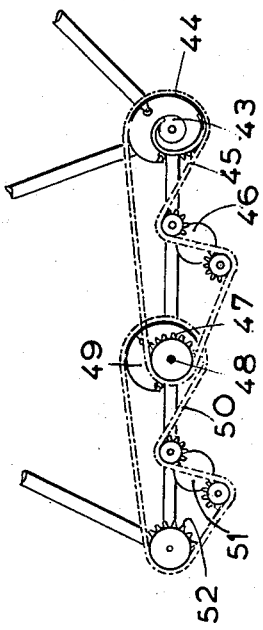
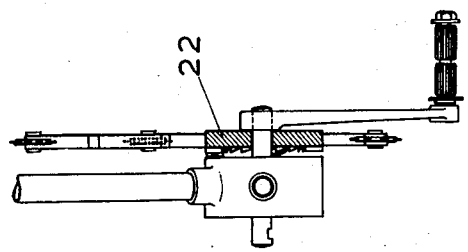
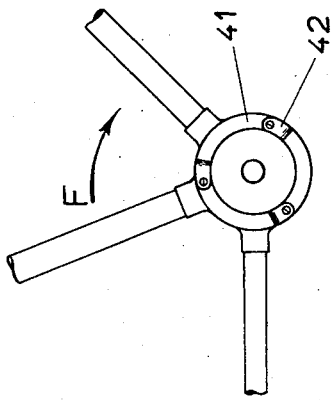
Inventor:
Louis A. Hayot
By: Young, Emery & Thompson
Attys.

Feb. 5, 1952 L. A. HAYOT 2,584,447
VARIABLE-SPEED CHAIN DRIVING DEVICE
Filed Sept. 3, 1947 5 Sheets-Sheet 4
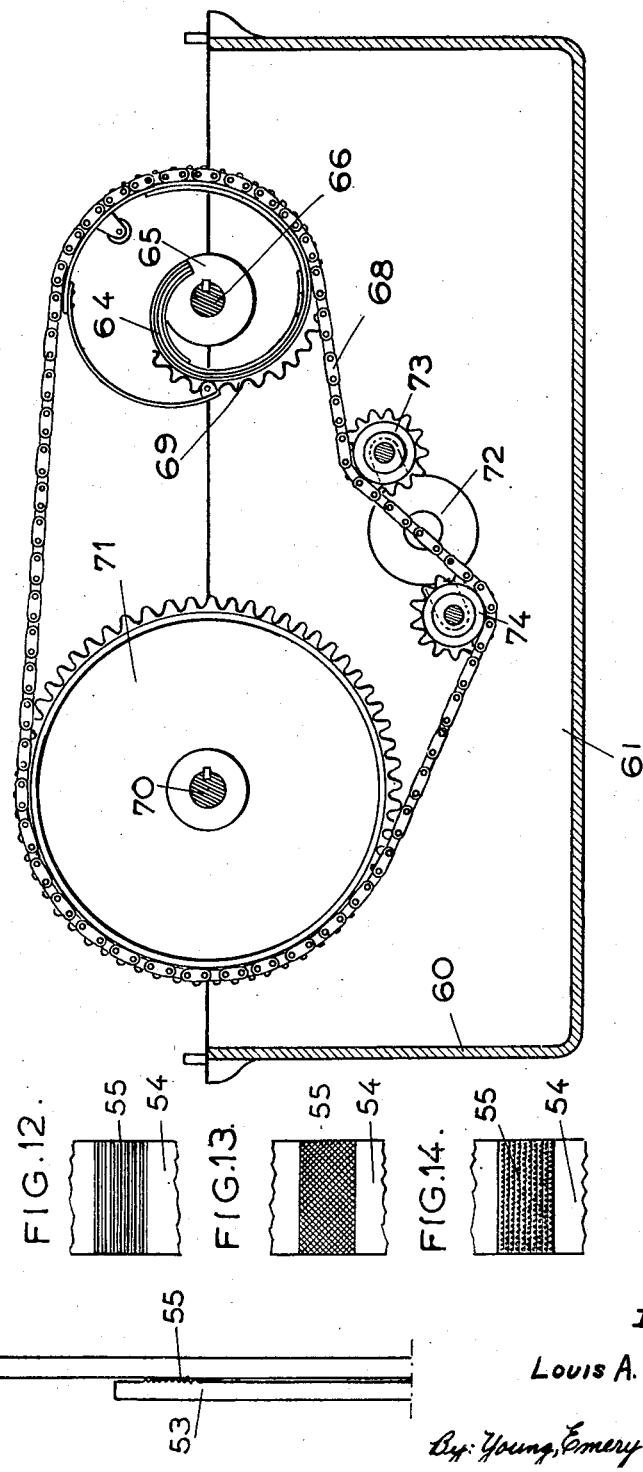
Inventor:
Louis A. Hayot
By: Young, Emery & Thompson
Attys

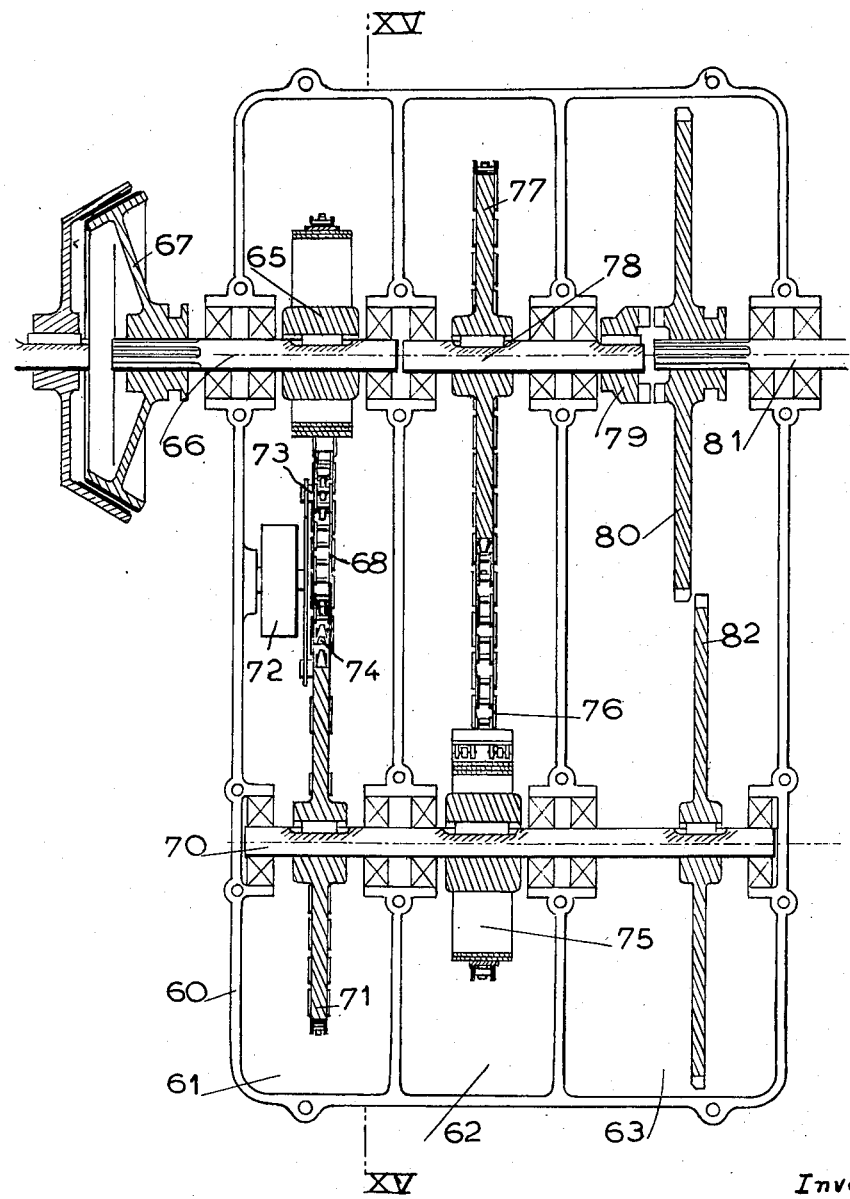

Patented Feb. 5, 1952

2,584,447

UNITED STATES PATENT OFFICE 2,584,447

VARIABLE-SPEED CHAIN DRIVING DEVICE

Louis Adolphe Hayot, Paris, France

Application September 3, 1947, Serial No. 771,880
In France September 13, 1946

17 Claims. (Cl. 74—217)

It is known that chain transmission devices are employed in bicycles, automobile vehicles and various other vehicles or fixed installations.

In such devices, gear-changing has hitherto only been effected by mechanisms which can only effect a discontinuous change and which require a separate manipulation at each change.

The object of the present invention is to provide a chain-operated variable speed gear which ensures a continuous and automatic gear-change according to the resistance offered by the driven shaft.

Another object of the invention is to apply such devices to the drive of a bicycle.

Yet a further object of the invention is to apply the devices in question to gear boxes for automobile vehicles.

Further objects and further features of the invention will be apparent from the following description, which is given with reference to the accompanying drawings which show solely by way of example various embodiments of the invention and in which:

Fig. 1 is an overall view of the variable-speed gear as applied to a bicycle of normal type.

Figure 2 shows the driving device proper,

Figures 3 and 4 relate to constructional details of one arm of the driving device, Figure 5 is a modified embodiment of the driving device, Figure 6 is a diagrammatic section on the line VI—VI of Figure 5, Figure 7 is a fragmentary side elevation of a bicycle frame alone, embodying the improvement according to one feature of the present invention, Figure 8 is a corresponding profile view, partly in section, showing the hub and the driving member, Figure 9 is a front view of this member alone, seen from the inside, Figure 10 is a diagrammatic side view of the composite variable-speed gear for a sports bicycle, Figure 11 is a fragmentary elevational view of one resilient arm, Figures 12 to 14 are fragmentary front views of the master blade according to various embodiments of the progressive abutments, Figure 15 is a vertical sectional view on the line XV—XV of Figure 16, and Figure 16 is a horizontal sectional view through the junction plane of a two-piece variable-speed gear casing.

As is shown in Figures 1 and 2, a hub 22 is mounted on the shaft 21 of the pedals of the bicycle. Secured to this hub 22 are flexible arms 23, six in the example illustrated which carry at their extremities sprocket rollers 24 serving to take up and drive the chain 25 of the bicycle. The flexible arms 23 are tangentially secured to the hub 22 which acts as winding drum for them and affords a support ensuring regular elastic deformation thereof when they become curved under the action of the chain 25.

According to one of the features of the invention, the flexible arms 23 are so fashioned and arranged that their modulus of section varies automatically in proportion as their curvature is accentuated. This feature enables the arms 23 to fulfil the following two contradictory conditions:

(a) that they are sufficiently rigid to be only moderately deflected under the normal tractive force of the chain corresponding to full development;

(b) that they are sufficiently flexible to be wound for their whole length on the drum of the hub 22 and to obtain the greatest possible difference between maximum development and minimum development.

The variation of the modulus with the curvature permits of providing a solution satisfying these requirements and of obtaining a suitable deflection with a tension of the chain varying substantially only from single to double.

Figures 3 and 4 show embodiments of the variation of the modulus of the flexible arm 23. The arm is constituted by banked resilient blades 26, similar to those of normal laminated springs, but connected together in pairs by a small bracket 27 which is supported by the upper blade and against which there abuts the edge of the lower blade, the relative longitudinal sliding of which is thus impeded. This bracket 27 can be formed by a tongue (Figure 3) cut out of the upper blade, or by a blade element 27 (Figure 4) specially fitted. The bearing surface of the bracket or element 27 forms with the normal to the blade an angle $a$ equal to or slightly greater than the angle of friction. Under these conditions, the assembly of banked blades constitutes a sort of composite beam at the small curvatures of the arm in the neighbourhood of the full development. However, beyond a certain curvature the increasing reaction of the blades on the brackets causes the brackets (Figure 3) or the blades themselves (Figure 4) to be somewhat deflected and the blades slide on the inclined support afforded by the brackets and become independent. When this stage is reached, the modulus of one arm of $n$ blades which was $n^2$ times that of a separate blade when the blades were functioning in combination as a composite beam, is only $n$ times the modulus of a single blade when they are functioning separately as simply superposed bearers. The arms therefore become $n$ times as flexible; the flexibility being inversely proportional the modulus of section.

The extremity of the master blade of each arm 23 is bent over and crocked (Figures 2 to 4) and carries the toothed roller 24 intended to support and drive the chain 25. The rollers 24 are mounted in free-wheel fashion so as to turn only in the direction of rotation of the pedals. In this way, the pinion of the rear wheel can be a simple driven wheel pinion.

This driving device, which constitutes the essential element of the variable-speed, is completed by a chain-tensioning device (Figures 1 and 2) composed of a pulley 28 located on the extremity of an extensible arm 29 rocking on a pin 30 fixed to the frame of the bicycle. Owing to this device, the lower side of the chain 25 successively accompanies each of the arms 23 in its expansion when it passes to the upper side.

In addition, the chain coming from the pulley 28 passes over toothed pinions 31, 32 mounted on the extremities of a lever 33. A spring is located in a barrel 34 and drives the pinions 31 and 32 constantly in the direction of the pedals while tending to turn the lever 33 in the clockwise direction.

A chain-securing member of known type permits of opening the chain rapidly without tools in order to de-tension all the springs and to rest them when the machine remains stationary for any length of time.

On a level track, under windless conditions and at the normal speed of the average cyclist, the flexible arms 33 are substantially in complete extension, and only have the slight deflection which is necessary to maintain the chain constantly stretched to its full length, so that it cannot in any circumstances jump from the driving rollers 34.

When the tension of the chain increases on an incline or owing to a head wind, the arms become curved and bear against the drum of the hub 22. The axes of the rollers 24 describe substantially involute curves A—A¹ of this drum, as shown in broken lines in Figure 2, and move progressively towards the axis of the pedal crank gear, reducing the leverage of the chain 25 with respect to this axis, until they reach the limit positions shown in broken lines (A¹ in Figure 2), which correspond to the minimum development of the machine.

When, on the contrary, the tension of the chain reduces the arms 23 resume successively their normal curvature and length when passing successively from the lower side to the upper side of the chain.

On the other hand, the contour of the drum 22, in spite of the irregularities imparted thereto by the superposition of the blades 26 and the hanks or steps resulting therefrom, may be considered approximately as the evolute of the curve described by the driving rolls. The variations of length of the flexible arms 23, although they are not rectilinear, and consequently also very substantially those of the leverages of the chain 25, are approximately equal to the arcs along which the flexible arms 23 are wound or unwound on the hub 22. Thus, the variations of the development, which are proportional to those of the leverage of the chain, are continuously and automatically controlled by the variations in the tension of the chain, that is to say, by the variations of the resistance to the forward movement of the machine.

The modified form of the driving device shown in Figure 5 consists in that this device only comprises one arm 23, which is much longer and is wound on the hub when deflected, not only by a fraction of a turn, but by one whole turn and even more. This single arm 23 is also secured tangentially to the hub, in the same way as the multiple arms in Figure 2, and, like these, it is constituted by banked resilient blades having a variable modulus of section, with supporting brackets 27. The driving rollers are replaced by teeth 35 extending over a sector or about $3\pi/2$. Small rollers 36, such as those shown in diagrammatic section in Figure 6, maintain between the turns, when they are tightened, a sufficient interval to enable the teeth to engage therein without friction. The master blade of the arm 23 extends at 37 beyond the extremity of the spiral and bends over to bear against this spiral at a point nearer the hub 2, so as to prevent its extremity from floating and to maintain it in the plane of the turns and of the loop formed by the chain.

The teeth 35 (Figure 5) may advantageously be formed by tongues cut out of the thickness of the master blade or fitted on to this blade, which thus retains its flexibility. The teeth can also be formed by an undulatory strip fitted on the master blade, for example by electric welding (Figure 15).

The chain can in turn be an ordinary roller chain.

The driving device is normally enclosed in a casing 38 protecting the flexible arms, which can be lightly greased from dust and rain (Figures 2 and 5).

According to the embodiment shown in Figures 7 to 9 of the improvement in the mechanism controlling the drive of a bicycle chain, the hub 22 of the control member, which comprises for example resilient arms 23 each provided at its extremity with a free-wheel pinion 24 for driving the chain, has on its inner face a toothed rim 40 forming a ratchet wheel having teeth inclined in the direction permitting normal rotation of the crank gear. The frontal face 41 of the bearing in which the shaft supporting this hub rotated, is provided with pawls 42, for example three in number, constituted by spring blades secured by screws to this face, the extremities of which engage with the ratchet teeth. Owing to this arrangement, the pedal crank gear can only rotate in the normal pedalling direction indicated by the arrow F, and the engagement of the pawls 42 with the ratchet wheel 40 prevents any rearward rotation of the pedal crank gear when the pedals reach dead angles and the springs 23 are thus subjected to a smaller deflecting force and tend to become de-tensioned and to return the hub 22 and consequently the cranks and the pedals in the rearward direction.

Figure 10 shows a composite variable-speed gear formed of two simple variable-speed gears mounted in series on the frame of a sports bicycle. In the example of embodiment selected the hub of the pedal crank gear 43 supports the control member 44 constituted by a single spiral arm comprising composite spring blades similar to that shown in Figure 5. The chain 45 passes over a barrel-type tensioning device 46 and drives a toothed wheel 47 mounted loose on an intermediate spindle 48 secured to the fork of the bicycle frame and integral with a second control member 49 similar to that already described. This member drives the chain 50 which passes over the barrel-type tensioning member 51 and over the pinion 52 of the rear wheel. The total reduction is the product of the simple multiplications, which is supplied by the two devices coupled in series.

To ensure better progressiveness of the system of abutment (Figure 11) by which the characteristics of the composite spring are modified in proportion as its deflection increases, the faces opposite two adjacent blades 53 and 54 forming the flexible arms or arms of the control member have, for example, on a portion 55, transverse striations (Figure 12) crossed striations (Figure 13) or any roughened features (Figure 14) counteracting the relative sliding of these blades in the manner of successive stops protruding to a greater or lesser degree.

According to the embodiment of the compound variable-speed device applied to the construction of a gear box for automobile vehicles, which is shown in Figures 15 and 16, the gear box 60 in the example selected and illustrated in these figures comprises three adjacent compartments 61, 62 and 63, the first two of which each comprise a simple variable speed device of the type described with reference to Figure 5, in which the control member is constituted by a composite spring blade 64 turned spirally on its hub 65. In the first stage of the box, the driving shaft 66 driven by the clutch 67 has keyed thereon the hub 65 of this member. The chain 68 passing over the external teeth 69 of the composite spring 64, connects this shaft to a secondary shaft 70 on which the toothed wheel 71 is keyed. The chain 68 passes over a tensioning device, such as that already described with reference to a bicycle, constituted by a barrel 72 supporting by means of diametrically opposite arms two loose pinions 73 and 74 about which the chain passes.

In the compartment 62, which corresponds to the second stage of the gear box, the reducing device is the same: the secondary shaft 70 has keyed thereon the hub of a second control member 75, the chain 76 driving the toothed wheel 77 fixed or loose on the secondary shaft 78 following an extension of the input shaft of the gear box. This shaft 78 carries in its third compartment 63 a dog clutch 79 with which a toothed wheel 80 is arranged to engage, the said toothed wheel being mounted on the output shaft 81, which terminates in the universal joint of the transmission. The said wheel 80 can also be brought by means of a fork control mechanism not shown into engagement with a toothed wheel 82 keyed on the extension of the secondary shaft 70.

The two stages of this device function in the same manner as the simple variable-speed device which has been described in the parent patent, the speed of the driven shaft 81 resulting from the product of the reductions given by the two stages of the gear box. The wheel 80 sliding on the output shaft 81 is brought into engagement with the dog clutch 79 or with the wheel 82 according to whether the vehicle is running in the forward direction or in reverse.

In order to obtain the best mechanical output afforded by the direct drive over long level or slightly descending roads, it is sufficient to mount on the extremities opposite the shafts 66 and 78 two dog clutches, one of which is arranged to slide and is controlled by a fork connected to a lever located within reach of the driver's hand. The driver can thus manipulate this lever after having de-clutched the engine, in order to obtain direct drive as with an ordinary gear box.

The invention is naturally in no way limited to the embodiments described and illustrated, which have only been given by way of example, but it may comprise all modified forms of the various elements such as the flexible arms or the accessory parts without departing from the scope of the present invention.

More particularly, in the case of embodiments employing considerable driving torques, as in the case of a gear box for automobile vehicles for example, each reducing stage can be constituted by a plurality of simple devices in parallel, or the connection between the control member and the driven toothed wheel can comprise a plurality of chains in parallel whereby the effect transmitted can be increased without imparting an excessive modulus to the chain.

What I claim is:

1. A chain driving device for a shaft driven by a driving shaft in which the driving shaft drives the chain through flexible elements constituted by stepped or banked spring blades, the relative sliding of which is counteracted by means for the abutment of the extremities of the blades in various staggered relations of said blades, to which correspond various modulus of section in a section of said flexible elements.

2. A chain driving device according to claim 1 wherein said abutment means are formed by brackets fitted on the blades and the bearing surface of which lies at an angle slightly greater than the angle of friction.

3. A chain driving device for a shaft driven by a driving shaft in which the driving shaft drives the chain through flexible elements constituted by stepped or banked spring blades, the relative sliding of which is counteracted by striations on faces opposite two adjacent blades.

4. A chain driving device for a shaft driven by a driving shaft in which the said driving shaft drives the chain through flexible elements comprising flexible arms having in a section a variable modulus of section, which are mounted tangentially on a hub integral with the said driving shaft, the said arms having at their extremities sprocket rollers with which the chain meshes.

5. A chain driving device for a shaft driven by a driving shaft in which the said driving shaft drives the chain through a spiral flexible arm having in a section a variable modulus of section constituted by stepped or banked spring blades, the relative sliding of which is counteracted by means for the abutment of the extremities of the blades in various staggered relations of said blades mounted tangentially on a hub integral with the said driving shaft, of great length and carrying teeth with which the chain meshes.

6. A chain driving device according to claim 5, wherein rollers are disposed on the inner face of said spiral flexible arm for bearing on the adjacent turn in winding of said arm and preventing contact of the teeth of said inner turn with said face.

7. A chain driving device for a bicycle having a frame, which comprises in combination a hub journalled in said frame, a spiral flexible arm having in a section a variable modulus of section, mounted tangentially on said hub, of great length and carrying teeth with which the chain meshes, said flexible arm being constituted by stepped spring blades the relative sliding of which is counteracted by roughened features protruding on faces opposite two adjacent blades, rollers being disposed on the inner face of said spiral flexible arm for bearing on the adjacent turn in winding of said arm and preventing contact of the teeth of said inner turn with said face, a rocking lever pivoted on said frame supporting two toothed rollers over which the chain passes being driven by a spring in the appropriate direction to maintain the chain constantly under tension, said hub having opposite the socket of the frame supporting said hub ratchet teeth engaging resilient pawls secured on the said socket to prevent recoil of the pedals when traversing dead angles.

8. A chain driving wheel comprising a hub, flexible elements secured by their inner end to said hub, and constituted by stepped or banked spring blades, means on the inner face of each blade for abutment of the end of the adjacent inner blade with a bearing surface forming with the normal an angle substantially equal to the angle of friction for automatically varying the modulus of section of a section of said elements according to the degree of depression of the same towards the hub, and sprocket means on outer portions of said elements.

9. A chain driving wheel comprising a hub, at least a flexible arm secured by its inner end to said hub, adapted to be resiliently bent over said hub, and constituted by stepped or banked spring blades, means on the inner face of each blade for abutment of the end of the adjacent inner blade with a bearing surface forming with the normal an angle substantially equal to the angle of friction for automatically varying the modulus of section of a section of said arm according to the degree of bending of said arm, and sprocket means on the outer part of said arm.

10. A chain driving wheel comprising a hub, at least a flexible arm tangentially secured by its inner end to said hub, adapted to be resiliently bent over said hub and composed of a plurality of spring blades of increasing length from the inner to the outer one, sloping abutting means for the free end of each inner blade, secured to the next outer blade for keeping said blades in fixed contacting relation to each other with a given modulus of section in a section of said arm till a given degree of bending of said arm and for sliding against said free end in loosed relation of said blades to afford a reduced modulus of said section for a further bending of said arm, and sprocket means on the outer part of said arm.

11. A chain driving wheel comprising a hub, a spiral flexible arm tangentially secured by its inner end to said hub, wound by more than one turn around said hub and adapted to be resiliently bent over said hub and composed of a plurality of spring blades of increasing length from the inner to the outer one, sloping abutting means for the free end of each inner blade secured to the next outer blade for keeping said blades in fixed contacting relation to each other with a given modulus of section in a section of said arm till a given degree of bending of said arm and for sliding against said free end in another relation of said blades to afford a reduced modulus of said section for a further bending of said arm, and sprocket means for a chain on the outer part of said arm.

12. A chain driving wheel comprising a hub, a plurality of similar flexible arms tangentially secured by their inner ends to the periphery of said hub, adapted to be resiliently bent over said hub and each composed of a plurality of spring blades of increasing length from the inner to the outer one, sloping abutting means for the free end of each inner blade secured to the next outer blade for keeping said blades in fixed contacting relation to each other with a given modulus of section in a section of said arm till a given degree of bending of said arm and for sliding against said free end in another relation of said blades to afford a reduced modulus of said section for a further bending of said arm, and sprocket rollers carried at the free ends of said arms for taking up a chain to be driven by the wheel.

13. A chain driving wheel comprising a hub, a spiral flexible arm tangentially secured by its inner end to said hub, wound by more than one turn around said hub and adapted to be resiliently bent over said hub and composed of a plurality of spring blades of increasing length from the inner to the outer one, opposite surfaces of two adjacent blades near the end of the inner one of said blades being striated to provide sloping abutting means therebetween and to afford according to the abutting relation of said blades a step variation of the inertia characteristics of said flexible arm for successive degree of bending of said arm, and sprocket means for a chain on the outer part of said arm.

14. A variable speed gear, comprising in combination with a frame bearing a sprocket-gear driven shaft, a driving shaft journalled in said frame, a hub fixed on said driving shaft, at least a flexible arm tangentially secured by its inner end to said hub, adapted to be resiliently bent over said hub and composed of a plurality of spring blades of increasing length from the inner to the outer one, sloping abutting means for the free end of each inner blade secured to the next outer blade for keeping said blades in fixed contacting relation to each other with a given modulus of section in a section of said arm till a given degree of bending of said arm and for sliding against said free end in loosed relation of said blades to afford a reduced modulus of said section for a further bending of said arm, sprocket means on the outer part of said arm, a chain passing on said sprocket gear and on said sprocket means, and means supported by said frame and resiliently acting on said chain for keeping it under tension.

15. A variable speed gear, comprising in combination with a frame bearing a sprocket-gear driven shaft, a driving shaft, a hub fixed on said driving shaft journalled in said frame, a spiral flexible arm tangentially secured by its inner end to said hub, wound by more than one turn around said hub and adapted to be resiliently bent over said hub and composed of a plurality of spring blades of increasing length from the inner to the outer one, sloping abutting means for the free end of each inner blade secured to the next outer blade for keeping said blades in fixed contacting relation to each other with a given modulus of section in a section of said arm till a given degree of bending of said arm and for sliding against said free end in loosed relation of said blades to afford a reduced modulus of said section for a further bending of said arm, sprocket means on the outer part of said arm, a chain passing on said sprocket gear and on said sprocket means and means supported by said frame and resiliently acting on said chain for keeping it under tension.

16. A variable speed gear, comprising in combination with a frame bearing a sprocket-gear driven shaft, a driving shaft journalled in said frame, a hub fixed on said driving shaft, a spiral flexible arm tangentially secured by its inner end to said hub, wound by more than one turn around said hub and adapted to be resiliently bent over said hub and composed of a plurality of spring blades of increasing length from the inner to the outer one, opposite surfaces of two adjacent blades near the end of the inner one of said blades being striated to provide sloping abutting means therebetween and to afford according to the abutting relation of said blades a step variation of the inertia characteristics of said flexible arm for successive degree of bending of said arm, sprocket means for a chain on the outer part of said arm, a chain passing on said sprocket gear and on said sprocket means, and means supported by said frame and resiliently acting on said chain for keeping it under tension.

17. A variable speed gear comprising a casing, an input shaft, an output shaft and a speed reducing connection between said shafts formed by successive reducing gears in each of which a chain passing over tensioning means connects a sprocket driven shaft to a driving shaft through flexible elements constituted by stepped spring blades outwardly provided with sprocket means, the relative sliding of said blades being counteracted by means for the abutment of their extremities in various staggered relations, to which correspond various inertia characteristics of said flexible elements in order that the leverage vary according to the resistance offered by the driven shaft thus effecting a continuous and automatic change of speed.

LOUIS ADOLPHE HAYOT.

REFERENCES CITED

The following references are of record in the file of this patent:

UNITED STATES PATENTS

| Number | Name | Date |
|---|---|---|
| 593,285 | Van Eyck | Nov. 9, 1897 |
| 724,450 | Dumaresq | Apr. 7, 1903 |
| 915,470 | Owens | Mar. 16, 1909 |
| 1,279,547 | Hueber | Sept. 24, 1918 |
| 2,108,941 | Morgan | Feb. 22, 1938 |

FOREIGN PATENTS

| Number | Country | Date |
|---|---|---|
| 669,078 | France | July 27, 1929 |